United States Patent
Kutsuzawa et al.

(10) Patent No.: US 7,016,149 B2
(45) Date of Patent: Mar. 21, 2006

(54) RECORDING MAGNETIC HEAD AND MAGNETIC STORAGE DEVICE USING THE SAME

(75) Inventors: Tomoko Kutsuzawa, Kawasaki (JP); Ikuya Tagawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 123 days.

(21) Appl. No.: 10/288,952

(22) Filed: Nov. 6, 2002

(65) Prior Publication Data
US 2003/0174441 A1 Sep. 18, 2003

(30) Foreign Application Priority Data
Mar. 18, 2002 (JP) .............................. 2002-074734

(51) Int. Cl.
*G11B 5/147* (2006.01)
(52) U.S. Cl. .................................... 360/126
(58) Field of Classification Search .............. 360/126, 360/317, 125
See application file for complete search history.

(56) References Cited

U.S. PATENT DOCUMENTS

| | | | | |
|---|---|---|---|---|
| 4,815,197 A | | 3/1989 | Ota et al. ..................... 29/603 |
| 4,926,276 A | | 5/1990 | Orikasa et al. ............. 360/126 |
| 5,473,491 A | * | 12/1995 | Fujisawa et al. ........... 360/126 |
| 6,091,582 A | * | 7/2000 | Komuro et al. ............. 360/126 |
| 6,356,410 B1 | * | 3/2002 | Chesnutt et al. ............ 360/126 |
| 6,407,885 B1 | * | 6/2002 | Ahagon et al. ............. 360/126 |
| 6,456,461 B1 | * | 9/2002 | Sato .......................... 360/126 |
| 6,487,041 B1 | * | 11/2002 | Yamanaka et al. .......... 360/126 |
| 6,530,141 B1 | * | 3/2003 | Komuro et al. ......... 29/603.14 |
| 6,650,503 B1 | * | 11/2003 | Chen et al. ................. 360/126 |
| 6,751,052 B1 | * | 6/2004 | Tagawa et al. ............. 360/126 |
| 2001/0000446 A1 | * | 4/2001 | Mino .......................... 360/317 |
| 2001/0013992 A1 | | 8/2001 | Tagawa et al. ............. 360/126 |
| 2001/0043445 A1 | | 11/2001 | Nishida et al. ............. 360/317 |
| 2002/0071209 A1 | * | 6/2002 | Watanabe et al. .......... 360/126 |

FOREIGN PATENT DOCUMENTS

| | | |
|---|---|---|
| EP | 246 706 | 11/1987 |
| EP | 379 248 | 7/1990 |

* cited by examiner

*Primary Examiner*—Angel Castro
(74) *Attorney, Agent, or Firm*—Greer, Burns & Crain, Ltd.

(57) ABSTRACT

According to the present invention, a recording magnetic head suitable for increasing a surface recording density and having a large recording magnetic field and a small recording blur is provided. A lower magnetic pole layer and an upper magnetic pole layer opposing the lower magnetic pole layer are formed, and a lower sub magnetic pole composed of a plurality of magnetic layers is formed along a medium facing face on the lower magnetic pole layer. The lengths in a direction perpendicular to the medium facing face of the respective magnetic layers forming the lower sub magnetic pole are longer as the respective magnetic layers get further away from the upper magnetic pole layer.

10 Claims, 6 Drawing Sheets

RECORDING MAGNETIC HEAD AND MAGNETIC STORAGE DEVICE USING THE SAME

BACKGROUND OF THE INVENTION

This application claims the benefit of Japanese Patent Application No. 2002-074734 filed Mar. 18, 2002 in the Japanese Patent Office, the disclosure of which is hereby incorporated by reference.

1. Field of the Invention

The present invention generally relates to a recording magnetic head used in a magnetic disk, a magnetic tape and the like, and a magnetic storage device using the same.

2. Description of the Related Art

In a magnetic storage device where information on a magnetic storage medium is recorded and reproduced, a head of a combined type is generally used. The combined type head is a head in which a magnetic head for reproducing using an MR element and the like is provided with a magnetic head for recording of an induction type made from a thin film.

In the magnetic storage device, an approach has been made with regards to the recording magnetic head to narrow the recording track width to increase the surface recording density. The narrowing of the track width is usually achieved by narrowing the core width of the recording magnetic head. However, this causes the track width to be less than or equal to 0.5 μm, causing a problem of recording blurs. The recording blur is a phenomenon in which, when recording information, the information tends to get recorded on the sides of the desired track or the information on the adjacent track tends to get erased. Therefore, if the recording blurs spread in the track width direction, the virtual track width increases and the narrowing of the track width is impeded. As a recording magnetic head that devised countermeasures against such recording blurs, a recording magnetic head in which a lower magnetic pole layer is provided with a lower sub magnetic pole in a direction facing an upper magnetic pole layer is known, as disclosed in for example, Japanese Laid-Open 2000-99918.

Furthermore, to further increase the surface recording density, a recording bit length or the length of 1 bit of information recorded on the magnetic recording medium is shortened. However, if the recording bit length is shortened, a demagnetizing field of the recording bit increases, and it becomes necessary to increase the coercive force of the magnetic recording medium to an extent sufficient enough to overcome this demagnetizing field. In response to this increase in coercive force, the recording magnetic head must magnetize such magnetic recording medium sufficiently. To this end, it becomes necessary to increase the recording magnetic field near the medium facing face of a gap layer of the recording magnetic head where the magnetic recording medium is located.

One of the methods of achieving the above is to narrow the surface perpendicular to a direction that magnetic flux of the lower sub magnetic pole of the recording magnetic head passes, that is, the surface perpendicular to the film thickness of the lower sub magnetic pole, to concentrate the leakage magnetic flux from the lower sub magnetic pole near the medium facing face of the gap layer where the magnetic recording medium is located, and to increase the recording magnetic field.

SUMMARY OF THE INVENTION

However, with just this method, the surface area through which the magnetic flux of the lower sub magnetic pole may pass is decreased causing the magnetic flux density of such magnetic flux to increase. Consequently, the lower sub magnetic pole is magnetically saturated more strongly, and the recording magnetic field is extensively distributed in a track width direction to the outside of the lower sub magnetic pole. Thus, the recording blurs are greater.

On the one hand, if the surface perpendicular to the film thickness of the lower sub magnetic pole of the recording magnetic head is widened, the magnetic flux density passing through the lower sub magnetic pole decreases and thus the recording blurs decrease. However, in order to widen the lower sub magnetic pole, the length in a direction perpendicular to the medium facing face of the lower sub magnetic pole is usually made longer while the core width of the lower sub magnetic pole is fixed, and thus the leakage magnetic field is not concentrated near the medium facing face of the gap layer, and the recording magnetic field decreases.

Accordingly, it is a general object of the present invention to provide, with regards to a recording magnetic head having a lower sub magnetic pole, a recording magnetic head that suppresses the magnetic saturation of the lower sub magnetic pole, has a smaller recording blur and a larger recording magnetic field, as well as a magnetic storage device provided with such magnetic head.

The present invention achieves the above object by providing a recording magnetic head having a lower magnetic pole layer and an upper magnetic pole layer placed opposite the lower magnetic pole layer, with a lower sub magnetic pole being formed on the lower magnetic pole layer, and the lower sub magnetic pole becoming narrowed in a direction from the lower magnetic pole layer towards the upper magnetic pole layer.

According to the present invention, a surface perpendicular to the film thickness of the lower sub magnetic pole narrows in the direction from the lower magnetic pole layer towards the upper magnetic pole layer. Since the magnetic flux density is inversely proportional to the area of the surface perpendicular to the magnetic flux direction of the part where the magnetic flux of the magnetic flux density passes, the magnetic flux density of the magnetic flux passing through the lower sub magnetic pole decreases as the lower magnetic pole layer gets closer, when seen in a direction from the part of the lower sub magnetic pole located close to the upper magnetic pole layer towards the lower magnetic pole layer. As a result, at the part of the lower sub magnetic pole located distant from the upper magnetic pole layer, magnetic saturation is less likely to occur. On the other hand, if the surface perpendicular to the film thickness of the part of the lower sub magnetic pole close to the upper magnetic pole layer is narrowed, and especially if the length perpendicular to the medium facing face of the upper sub magnetic pole is shortened, the magnetic flux passing through the lower sub magnetic pole can be efficiently concentrated in the vicinity of the medium facing face near the gap layer. Therefore, a recording magnetic head having a large recording magnetic field and a small recording blur can be achieved.

The present invention further achieves the above object by providing a magnetic storage device provided with a recording magnetic head described above.

According to the magnetic storage device of the present invention, by virtue of the recording magnetic head of a small recording blur and a large recording magnetic field, a magnetic storage device capable of increasing the surface recording density is achieved.

DESCRIPTION OF THE PREFERRED EMBODIMENTS

The embodiments of the present invention will be explained hereinafter based on the figures.

Figure 1:
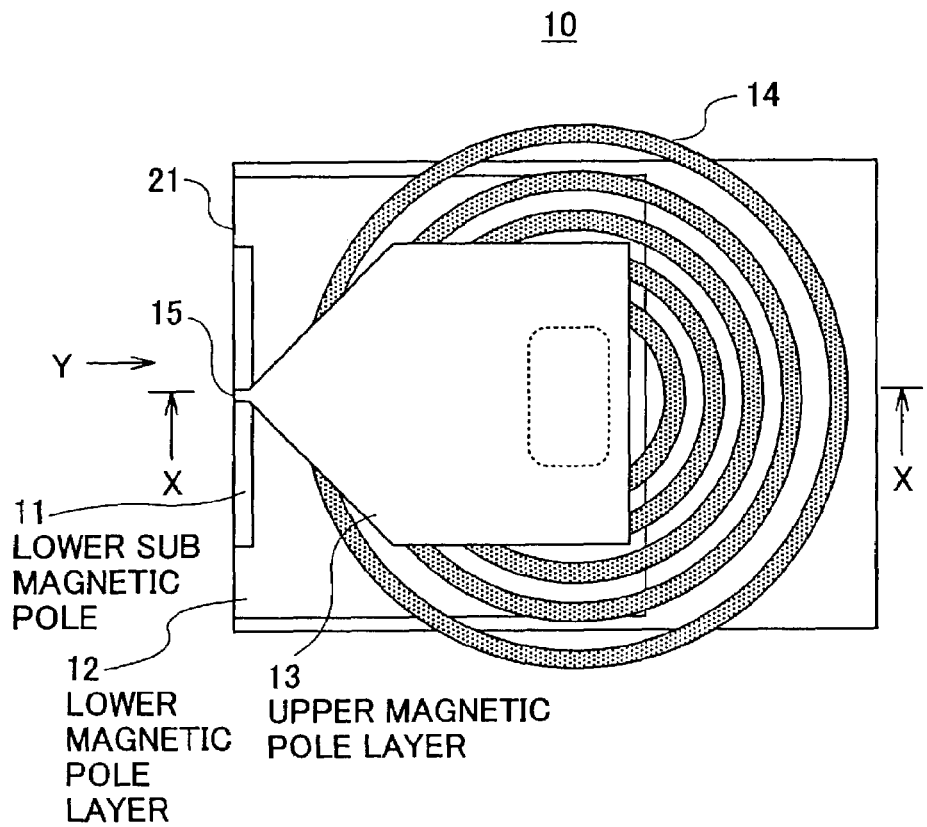
FIG. 1 is a plan view of a combined type magnetic head provided with a recording magnetic head having a lower sub magnetic pole of the present invention.
Figure 2:
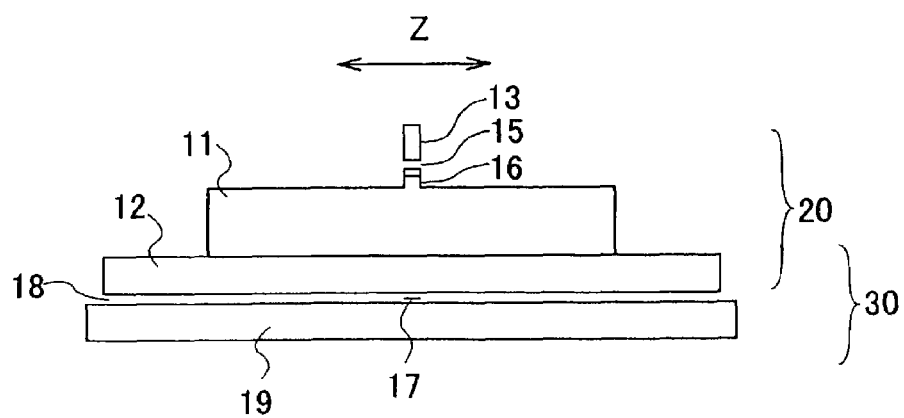
FIG. 2 is a diagram showing a structure of a medium facing face of the combined type magnetic head seen from direction Y of FIG. 1.

With reference to FIG. 1 and FIG. 2, a structure of a combined type magnetic head 10 in which a recording magnetic head is provided with a reproducing MR head is described as an example of the recording magnetic head of the present invention. FIG. 1 shows a planar structure of the combined type magnetic head 10 seen from the side of an upper magnetic pole layer of the recording magnetic head 20. FIG. 2 shows a structure of a medium facing face 21 seen from the direction Y represented with an arrow in FIG. 1.

In the magnetic storage device, recording and reproducing is performed by placing the medium facing face 21 of the combined type magnetic head 10 in close proximity to the magnetic storage medium so as to face each other. Furthermore, the magnetic recording medium moves in a direction from the inside of the plane of the diagram towards the outside of the diagram, or towards the viewer in FIG. 1, and in a direction from the bottom of the diagram towards the top of the diagram in FIG. 2.

The combined type magnetic head 10 includes a reproducing MR head 30 and an induction type recording magnetic head 20. The recording magnetic head 20 is provided with a structure on the side of the medium facing face 21 facing the magnetic recording medium to be scanned, in which structure an upper magnetic pole layer 13 and a lower magnetic pole layer 12 are placed opposite one another with a small gap layer 15 in between. On the lower magnetic pole layer 12 in a direction facing the upper magnetic pole layer 13, a lower sub magnetic pole 11 is provided contacting the lower magnetic pole layer 12.

A spiral shaped conductor coil 14 is wounded between the upper magnetic pole layer 13 and the lower magnetic pole layer 12. When current flows through the conductor coil 14, the upper magnetic pole layer 13, the lower magnetic pole layer 12, and the lower sub magnetic pole 11 being in a magnetically contacting relationship with each other are magnetized. Near the medium facing face 21 of the gap layer 15, being a non-magnetic layer, placed between the upper magnetic pole layer 13 and the lower sub magnetic pole 11, a magnetic field leaks out from the upper magnetic pole layer 13 and the lower sub magnetic pole 11 towards the magnetic recording medium side of the medium facing face 21. This leakage magnetic field is the recording magnetic field. This recording magnetic field causes the magnetic recording medium to be magnetized, and information can then be recorded.

The MR head 30 utilizes an MR element 17 for reproducing the information. The MR element 17 is sandwiched between a lower shield layer 19 and the lower magnetic pole layer 12, and is embedded in an insulating layer 18. Here, the lower magnetic pole layer 12 acts as an upper shield layer for the MR head 30. As a result, at the tip of the recording magnetic head 20 near the medium facing face 21, the length in the track width direction Z of the lower magnetic pole layer 12 shown in FIG. 2 is longer than in the upper magnetic pole layer 13.

Instead of the MR element for such MR head 30, other reproducing elements such as a spin valve element may also be used. Furthermore, instead of using the MR head 30, the induction type recording magnetic head 20 may be used as the reproducing magnetic head.

Figure 3:
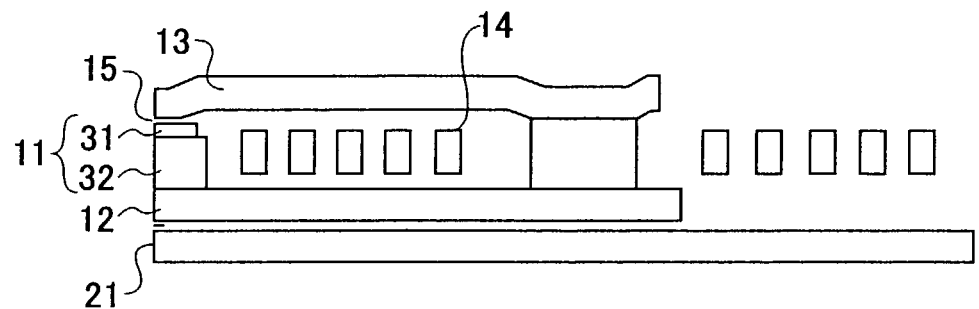
FIG. 3 is a sectional view showing the combined type magnetic head taken along line X—X of FIG. 1.

With reference to FIG. 3 and FIG. 4, a structure of the recording magnetic head 20 is shown. FIG. 3 is a sectional view taken along line X—X of FIG. 1. As shown in FIG. 3, the lower sub magnetic pole 11 is formed on the part of the lower magnetic pole layer 12 near the medium facing face 21. The lower sub magnetic pole 11 is formed on the lower magnetic pole layer 12 in a direction facing the upper magnetic pole layer 13.

Figure 4A:
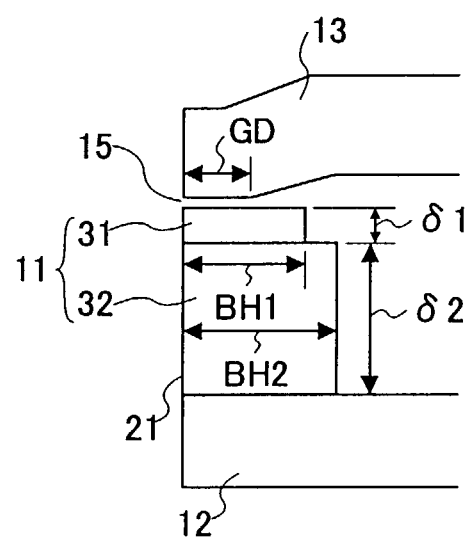
FIG. 4A is a sectional view of a tip of the recording magnetic head.
Figure 4B:
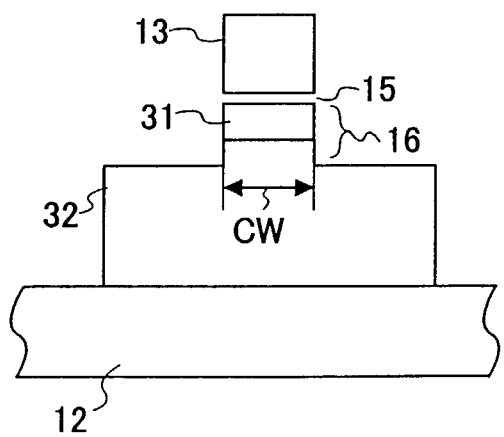
FIG. 4B is a diagram showing a structure of the medium facing face.

FIG. 4A is an exploded view of a portion of FIG. 3, showing the cross section of the tip of the recording magnetic head 20. FIG. 4B shows a structure of the medium facing face 21 of the portion shown in FIG. 4A. As shown in FIG. 4A and FIG. 4B, the lower sub magnetic pole 11 is composed of a plurality of magnetic layers 31 and 32 where one of the layers is placed on top of the other layer. The magnetic layer 31 is formed on a projected part 16 of the magnetic layer 32. Although the lower sub magnetic pole 11 is formed from two magnetic layers 31 and 32 here, it is to be noted that the lower sub magnetic pole 11 is not limited to be formed by two layers and it may be formed by just one layer or another layer may be additionally deposited and be formed by three layers.

As shown in FIG. 4B, the projecting part of the magnetic layer 32 forming the lower sub magnetic pole 11 is formed with the same core width CW as the core width of the upper magnetic pole layer 13 placed opposite the projecting part with the gap layer 15 in between. Here the core width CW is the length of the projecting part 16 or the upper magnetic pole layer 13 measured in the track width direction. In such recording magnetic head 20, since the write-in gap is formed using the projecting part 16 of the lower sub magnetic pole 11 having a narrower core width CW than the part of the lower magnetic pole layer 12 near the medium facing face 21, the track width of the magnetic recording medium may be narrowed. Here, the core width CW may be, for example, 0.3 μm.

It is to be noted that the shape of the projecting part 16 of the lower sub magnetic pole 12 is not limited to a case where the core width CW is fixed. For example, it may be of a shape where the core width CW increases in a direction from the upper magnetic pole layer 13 towards the lower magnetic pole layer 12.

As shown in FIG. 4A, the length of the magnetic layers 31 and 32 forming the lower sub magnetic pole 11 measured in a direction perpendicular to the medium facing face 21 is set to be BH1 and BH2, respectively. The length of the back height BH2 of the magnetic layer 32 located distant from the upper magnetic pole layer 13 is set to be longer than the back height BH1 of the magnetic layer 31 located close to the upper magnetic pole layer 13. The reason for this is explained below.

The area of the surface perpendicular to the film thickness of the respective magnetic layers 31 and 32 of the lower sub magnetic pole 11 through which the magnetic flux passes is determined by the back heights BH1 and BH2, and by the core width CW of the tip near the medium facing face 21. For example, if the core width CW is fixed, the area of the surface perpendicular to the film thickness of the respective magnetic layers 31 and 32 depends solely on the back heights BH1 and BH2. The magnetic flux density is derived by dividing the amount of magnetic flux by the area of such surface perpendicular to the film thickness of the respective magnetic layers. Since the total amount of magnetic flux passing through the magnetic layers 31 and 32 is constant, the magnetic density at each of the magnetic layers 31 and 32 only depends on the back heights BH1 and BH2.

Therefore, on the one hand, if the back height of the magnetic layer 31 located close to the upper magnetic pole layer 13 is short; the magnetic flux density of the magnetic layer 31 increases and a magnetic saturation, that has reached the saturation flux density Bs of the material of the magnetic layer 31, is more likely to occur. When magnetic saturation occurs, the magnetic layer 31 does not allow the amount of magnetic flux corresponding to the amount exceeding the saturation magnetic density Bs to pass, and thus the magnetic flux wraps around to the outside of the magnetic layer 31 (in the track width direction) and the distribution of the recording magnetic field diverges. In such case, the recording magnetic field near the medium facing face of the gap layer 15 decreases and the distribution of the recording magnetic field spreads in the track width direction.

On the other hand, if the back height BH1 of the magnetic layer 31 located close to the upper magnetic pole layer 13 is long; the magnetic flux density of the magnetic flux passing through the magnetic layer 31 decreases and the magnetic saturation will not occur. However, because the magnetic flux tends to move in not from the part of the magnetic layer 31 near the medium facing face but from the part of the magnetic layer 31 near the conductor coil 14, the recording magnetic field near the medium facing face of the gap layer 15 decreases.

Therefore, the back height BH2 of the magnetic layer 32 located distant from the upper magnetic pole layer 13 is made longer than the back height BH1 of the magnetic layer 31 located close to the upper magnetic pole layer 13, thus making the magnetic saturation less likely to occur, and decreasing the recording blurs. Here, the magnetic saturation of the magnetic layer 31 located close to the upper magnetic pole layer 13 is less likely to occur since the magnetic layer 32 is connected thereto.

The back height BH1 of the magnetic layer 31 located close to the upper magnetic layer 13 is set to be between 2 μm to 3 μm. Furthermore, the back height BH2 of the magnetic layer 32 located distant from the upper magnetic pole layer 13 is set to be between 3 μm to 4 μm. Here, the back height BH1 of the magnetic layer 31 is 3 μm and the back height BH2 of the magnetic layer 32 is 4 μm. Furthermore, the film thickness δ1 of the magnetic layer 31 is 0.5 μm and the film thickness δ2 of the magnetic layer 32 is 4 μm.

Preferably, the area of the surface perpendicular to the film thickness of the magnetic layer 31 closest to the upper magnetic pole layer 13 is greater than that of the under surface of the tip of the upper magnetic pole layer 13. In this embodiment, since the core width CW of the tip of the upper magnetic pole layer is the same as the core width CW of the lower sub magnetic pole, the back height BH1 of the magnetic layer 31 is preferably longer than the length of the tip of the upper magnetic pole layer 13 perpendicular to the medium facing face of the under surface, i.e., a gap depth GD, as shown in FIG. 4A. By making, of the magnetic layers forming the lower sub magnetic pole 11, the back height BH1 of the magnetic layer 31 closest to the upper magnetic pole layer 13 longer than the gap depth GD of the upper magnetic pole layer 13, the magnetic flux density of the magnetic flux passing through the magnetic layer 31 can be decreased.

Therefore, the magnetic saturation of the magnetic layer 31 is less likely to occur, and the recording magnetic head having a large recording magnetic field and a small recording blur can be achieved. Here, the gap depth of the upper magnetic pole layer 13 is for example, 1.0 μm and the back height BH1 of the magnetic layer 31 closest to the upper magnetic pole layer 13 is 3 μm, as mentioned above.

Furthermore, the materials used for the lower magnetic pole layer 12, the upper magnetic pole layer 13, and the lower sub magnetic pole 11 are selected from soft magnetic materials such as permalloy (NiFe), Sendust thin film (FeSiAl), iron nitride (FeN), Co base amorphous alloy and the like. In this embodiment, permalloy composed of 80% Ni and 20% Fe and having the saturation flux density Bs of 1.0T is used.

Figure 5A:
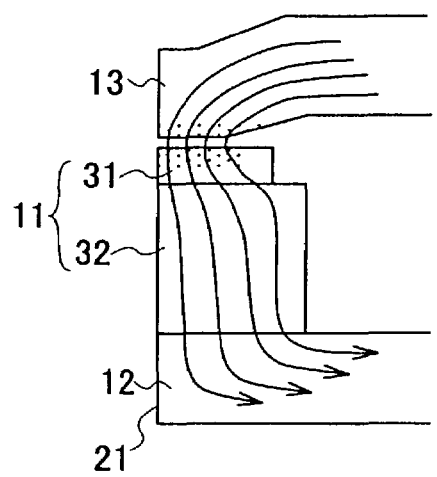
FIG. 5A is a sectional view showing a magnetic flux flow and a state of magnetic saturation according to an embodiment of the present invention.
Figure 6A:
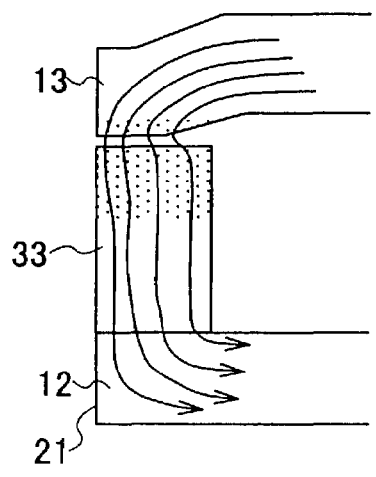
FIG. 6A is a sectional view showing a magnetic flux flow and a state of magnetic saturation according to a comparative example not in conformity with the present invention.
Figure 6B:
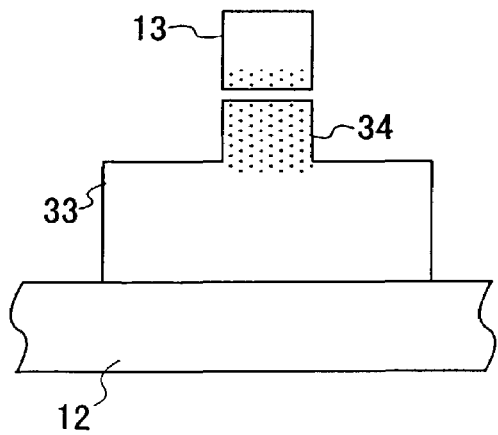
FIG. 6B is a diagram showing the magnetic flux flow and the state of magnetic saturation of the tip of the recording magnetic head according to the comparative example not in conformity with the present invention.

FIG. 5A shows, by way of example, a result of a simulation performed, using the three dimensional magnetic field analyzing software, on the recording magnetic head 20 according to the embodiment of the present invention. FIG. 6A and FIG. 6B show, as a comparative example that does not conform to the present invention, a case in which the lower sub magnetic pole 33 is formed by a single layer and the area of the surface perpendicular to the film thickness of the projecting part 34 of the lower sub magnetic pole 33 is fixed. Besides the back height of the lower sub magnetic pole 33 formed by a single layer being 3 μm and the film thickness being 4.5 μm, the structure of the recording magnetic head 20, and the current passing through the conductor coil 14 etc. are the same as those shown in the embodiment above. FIG. 6A and FIG. 6B show, by way of example, result of a simulation performed on the comparative example as has been done on the present embodiment.

Figure 5B:
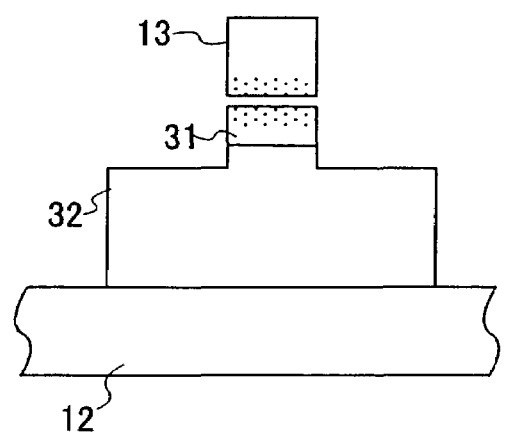
FIG. 5B is a diagram showing the magnetic flux flow and the state of magnetic saturation of the tip of the recording magnetic head according to the embodiment of the present invention.

FIG. 5A and FIG. 5B as well as FIG. 6A and FIG. 6B show the magnetic flux flow and the state of the magnetic saturation at the tip of the recording magnetic head 20. FIG. 5A and FIG. 6A are cross-sectional views, and FIG. 5B and FIG. 6B are diagrams showing the structure of the medium facing face 21. The arrows shown in the figures show the magnetic flux flow and the shaded part show the magnetically saturated part.

On the one hand, in the embodiment of the present invention, the magnetic layer 31 closest to the upper magnetic pole layer is connected to the magnetic layer 32 having a longer back height, and thus the magnetic flux flow spreads from the medium facing face 21 towards the conductor coil 14 side in the magnetic layer 31 and the magnetic layer 32 joined thereto, as shown in FIG. 5A. As a result, the part of the magnetic layer 31 close to the upper magnetic pole layer 13 is the only magnetically saturated part, as shown in FIG. 5A and FIG. 5B.

On the other hand, in the comparative example, because the lower sub magnetic pole 33 is formed by a single layer and the area of the surface perpendicular to the film thickness of the projecting part 34 is fixed, the magnetic flux flow passing through the lower sub magnetic pole 33 can not spread at the projecting part 34 of the lower sub magnetic pole 33 and thus the magnetic saturation occurs at the entire projecting part 34, as shown in FIG. 6A and FIG. 6B.

Therefore, in the comparative example, because the magnetic saturation occurs at the entire projecting part, the recording magnetic field spreads in the track width direction and the recording blurs become greater. However, in the embodiment of the present invention, since the magnetic saturation is suppressed to a part of the magnetic layer 31, that forms the lower sub magnetic pole 11, the spread of the recording magnetic field in the track width direction is suppressed, the recording blurs are less likely to occur, and the recording magnetic field is concentrated near the medium facing face of the gap layer.

Figure 7:
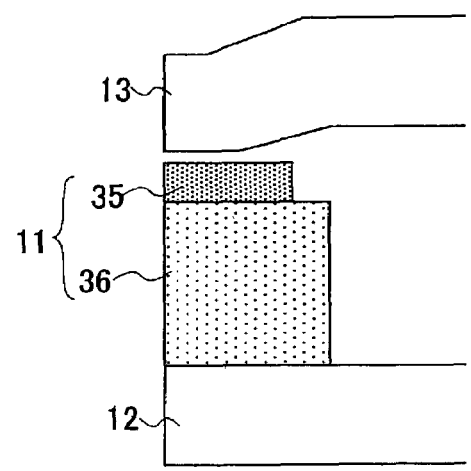
FIG. 7 is a sectional view showing a structure of the tip of the recording magnetic head according to an embodiment of the present invention.

Next, FIG. 7 shows a case in which, of the magnetic layers forming the lower sub magnetic pole 11, the layer located close to the upper magnetic pole layer is made of a material having a high saturation flux density Bs than the layer located distant from the upper magnetic pole layer. FIG. 7 is a sectional view of the tip of the recording magnetic head 20.

As shown in FIG. 7, the lower sub magnetic pole 11 is formed by two magnetic layers 35 and 36 made of materials having a different saturation flux density Bs. The magnetic layer 35 located close to the upper magnetic pole layer 13 has a higher saturation flux density Bs than the magnetic layer 36 located distant from the upper magnetic pole layer 13.

Since the lower sub magnetic pole 11 becomes narrower as it gets closer to the upper magnetic pole layer 13, the magnetic flux density passing through the lower sub magnetic pole 11 is higher in areas located close to the upper magnetic pole layer. In other words, the magnetic flux density of the magnetic flux passing through the magnetic layer 35 is higher than the magnetic flux density of the magnetic flux passing through the magnetic layer 36. In response to this, by forming the magnetic layer 35 from a material having a higher saturation flux density Bs than the magnetic layer 36, the magnetic saturation of the lower sub magnetic pole 11 can be suppressed.

Consequently, because the desired size of the recording magnetic field is obtained without it being saturated, and the spread of the recording magnetic field in the track width direction is suppressed, the recording blurs are less likely to occur. Here, the material of the magnetic layer 35 located close to the upper magnetic pole layer 13 is a FeCoNi metal alloy having a saturation flux density Bs of 2.0 T, and the material of the magnetic layer 36 located distant from the upper magnetic pole layer 11 is a permalloy composed of 50% Ni and 50% Fe and having a saturation flux density Bs of 1.5 T.

Figure 8:
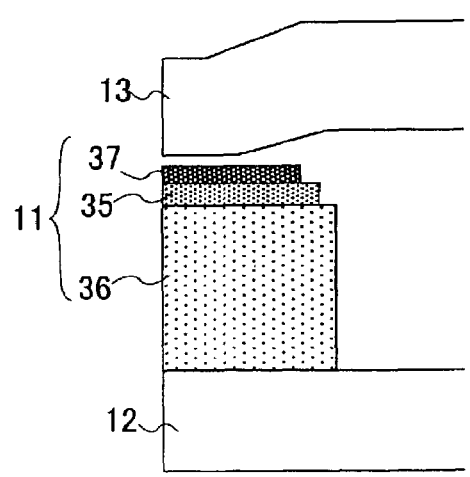
FIG. 8 is a sectional view showing a structure of the tip of the recording magnetic head according to an embodiment of the present invention.

Furthermore, the magnetic layers forming the lower sub magnetic pole 11 may be of more than three layers. For example, FIG. 8 shows an example where an additional magnetic layer 37 is formed on the magnetic layer 35, on the side closer to the upper magnetic pole layer 13 of the embodiment shown in FIG. 7. FIG. 8 is a sectional view of the tip of the recording magnetic head 20. The material of the magnetic layer 37 shown in FIG. 8 is a FeCoAlO having a saturation flux density of 2.4 T, the material of the magnetic layer 35 is a FeCoNi metal alloy having a saturation flux density of 2.0 T, and the material of the magnetic layer 36 is a permalloy composed of 50% Ni and 50% Fe and having a saturation flux density of 1.5 T.

Although the part of the lower sub magnetic pole on the side of the conductor coil has a step-like shape, it may also have a shape that changes continuously as in an inclined surface.

On the other hand, although in the above embodiment, an upper sub magnetic pole 37 is not formed on the upper magnetic layer 13, an upper sub magnetic pole 37 may be also be formed on the upper magnetic pole layer 13 in the direction of the lower sub magnetic pole 11, similar to the embodiment explained with the lower sub magnetic pole 11.

The magnetic flux near the medium facing face of the gap layer is concentrated and as a result the recording magnetic field is greater and the recording blurs are less likely to occur.

Figure 9A:
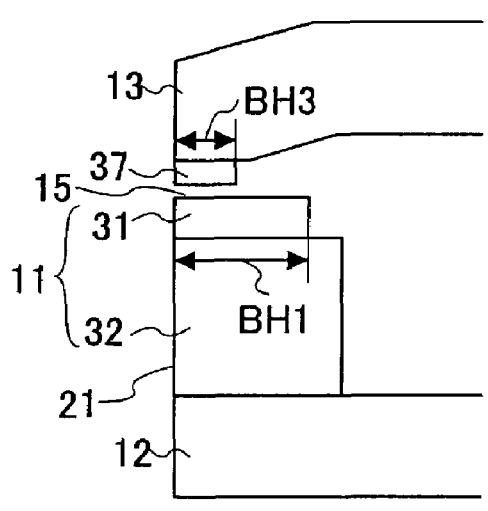
FIG. 9A is a sectional view of a tip of the recording magnetic head according to the present invention.
Figure 9B:
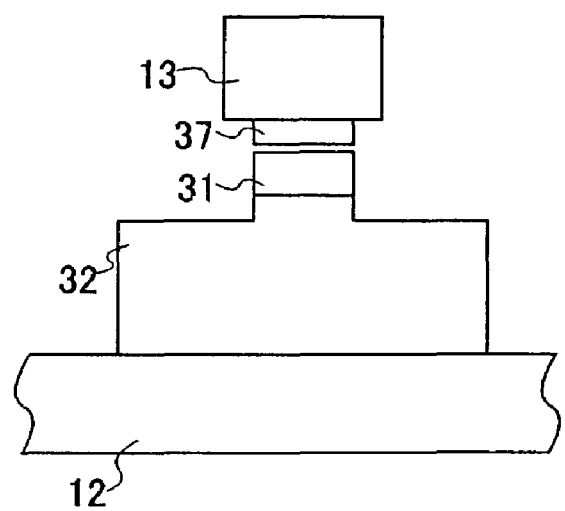
FIG. 9B is a diagram showing a structure of the medium facing face of the part shown in FIG. 9A.

One embodiment of such is shown in FIG. 9A and FIG. 9B. FIG. 9A is a sectional view of the tip of the recording magnetic head 20, and FIG. 9B is a diagram showing a structure of the medium facing face 21 of the part shown in FIG. 9A.

As shown in FIG. 9A and FIG. 9B, the upper sub magnetic pole 37 is formed contacting the upper magnetic pole layer 13. The core width of the upper sub magnetic pole 37 is the same as the core width of the magnetic layer 31 forming part of the lower sub magnetic pole 11.

Preferably, the upper sub magnetic pole 37 is formed so as to be wider in a direction from the lower sub magnetic pole 11 towards the upper magnetic pole layer 13. As explained above with the lower sub magnetic pole 11, the magnetic saturation is less likely to occur at the part of the upper sub magnetic pole 37 located distant from the lower sub magnetic pole 11. This is because the magnetic flux passing though the upper sub magnetic pole 37 can be more concentrated in the vicinity of the medium facing face 21 near the gap layer 15. In particular, the length BH3 in a direction perpendicular to the medium facing face of the upper sub magnetic pole 37 is preferably shorter than the back height BH1 of the magnetic layer 31 closest to the upper sub magnetic pole 37.

Furthermore, the upper sub magnetic pole 37 may be formed from a plurality of magnetic layers. Furthermore, of the magnetic layers forming the upper sub magnetic pole 37, the magnetic layer located closest to the lower sub magnetic pole 11 is preferably made of a material having a higher saturation flux density Bs than the magnetic layers located distant from the lower sub magnetic pole 11. The materials of the magnetic layers of the upper sub magnetic pole 37 can be the same as the materials of the magnetic layers of the lower sub magnetic pole 11.

Here, as a method of manufacturing the recording magnetic head 20, a known manufacturing method may be used. For example, as a method of forming the lower sub magnetic pole 11, the sputtering method, the plating method and the like may be used.

Figure 10:
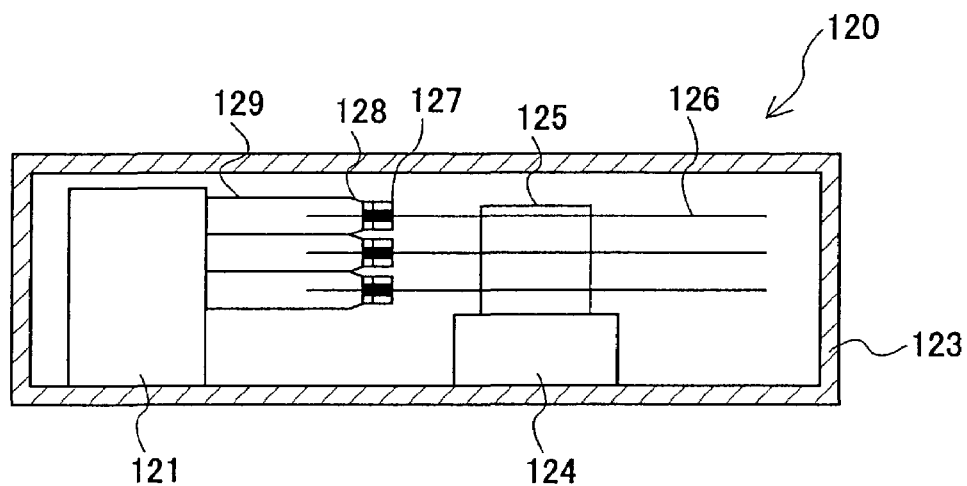
FIG. 10 is a sectional view showing a main part of an embodiment of the magnetic storage device according to the present invention.

Next, one embodiment of the magnetic storage device according to the present invention is explained with reference to FIG. 10 and FIG. 11. FIG. 10 is a sectional view showing the main body of one embodiment of the magnetic storage device 120, and FIG. 11 is a plan view showing the main body of one embodiment of the magnetic storage device 120.

Figure 11:
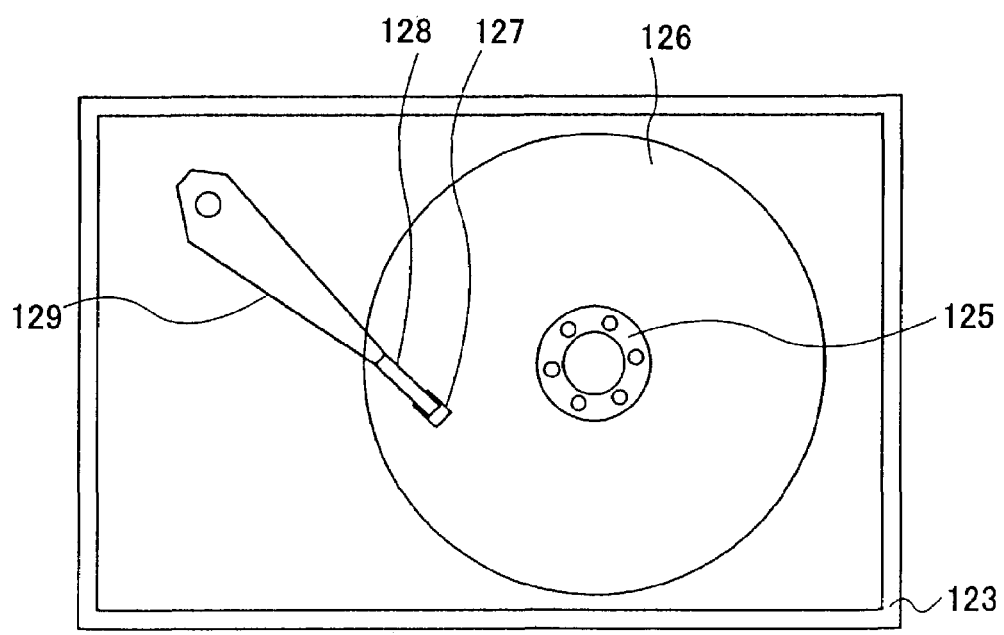
FIG. 11 is a plan view showing the main part of the magnetic storage device shown in FIG. 10.

As shown in FIG. 10 and FIG. 11, the magnetic storage device 120 generally consists of a housing 123. Inside the housing 123, there are provided a motor 124, a hub 125, a plurality of magnetic recording media 126, a plurality of combined type magnetic heads 127, a plurality of suspensions 128, a plurality of arms 129, and an actuator unit 121. The magnetic recording media 126 is attached to the hub 125 rotated by the motor 124. The combined type magnetic heads 127 are heads including an MR head equipped with a reproducing MR element and a recording magnetic head of a thin film head. Each of the recording and reproducing heads 127 is attached to the tip of the corresponding arm 129 via the suspension 128. The arm 129 is driven by the actuator unit 121. The basic structure of the magnetic recording device is well known and thus its detailed explanation will be omitted here.

The embodiment of the magnetic storage device 120 has its characteristic in its recording magnetic head of the combined type magnetic head 127. The recording magnetic head of the combined type magnetic head 127 has a structure described in the above embodiments. The number of the combined type magnetic head 127 is of course not limited to 6 and may be between 1 through 5, or may be more than 7. The basic structure of the magnetic storage device 120 is not limited to those shown in FIG. 10 and FIG. 11. Furthermore, the recording medium is not limited to a magnetic disk and could also be a magnetic tape.

While the preferred form of the present invention has been described, it is to be understood that the present invention is not limited to these embodiments, and variations and modifications may be made without departing from the scope of the present invention.

As is apparent from the above description, according to the present invention, magnetic saturation is less likely to occur at the lower sub magnetic pole and the magnetic flux passing through the magnetic pole is efficiently concentrated in the vicinity of the medium facing face near the gap layer. As a result, a recording magnetic head having a large recording magnetic field and a small recording blur is obtained and a recording magnetic head and a magnetic storage device capable of performing high density recording are achieved.

What is claimed is:

1. A recording magnetic head comprising:
   a lower magnetic pole layer;
   an upper magnetic pole layer opposing said lower magnetic pole layer; and
   a lower sub magnetic pole provided on said lower magnetic pole layer,
   wherein said lower sub magnetic pole has a cross-section thereof becoming narrower towards said upper magnetic pole layer, said cross-section being perpendicular to a thickness direction of the lower magnetic pole layer, and an extension of said cross-section in a direction perpendicular to a surface of a magnetic record medium is shorter at a first position than at a second position, said first position being closer to said upper magnetic pole layer than said second position, and
   wherein a length of a tip of said lower sub magnetic pole in the direction perpendicular to the surface of a magnetic record medium is longer than a length of a tip of said upper magnetic pole layer in the direction perpendicular to the surface of a magnetic record medium, said tip of said lower sub magnetic pole and said tip of said upper magnetic pole layer facing each other across a gap therebetween.

2. The recording magnetic head as claimed in claim 1, wherein said lower sub magnetic pole is composed of a plurality of magnetic layers sequentially stacked on said lower magnetic pole layer.

3. The recording magnetic head as claimed in claim 1, wherein said lower sub magnetic pole is made of a material having a saturation flux density thereof becoming higher towards said upper magnetic pole layer.

4. The recording magnetic head as claimed in claim 2, wherein, of the magnetic layers forming said lower sub magnetic pole, a magnetic layer closest to said upper magnetic pole layer is formed to have a larger surface than an under surface of a tip of said upper magnetic pole layer facing said lower sub magnetic pole.

5. The recording magnetic head as claimed in claim 1, wherein an upper sub magnetic pole is formed on said upper magnetic pole layer in a direction of said lower magnetic pole layer.

6. The recording magnetic head as claimed in claim 5, wherein said upper sub magnetic pole becomes wider towards said upper sub magnetic pole layer.

7. The recording magnetic head as claimed in claim 6, wherein said upper sub magnetic pole is composed of a plurality of sequentially stacked magnetic layers.

8. The recording magnetic head as claimed in claim 5, wherein said upper sub magnetic pole is made of a material having a saturation flux density thereof becoming lower towards said upper magnetic pole layer.

9. The recording magnetic head as claimed in claim 5, wherein, of magnetic layers forming said lower sub magnetic pole, a magnetic layer closest to said upper magnetic pole layer has a larger surface than a magnetic layer closest to said lower sub magnetic pole of magnetic layers forming said upper sub magnetic pole.

10. A magnetic storage device comprising a recording magnetic head claimed in claim 1.

* * * * *